Feb. 25, 1930.　　D. L. VAN METER ET AL　　1,748,259

TOOL RACK

Filed Dec. 18, 1928

DALE L. VAN METER
BARTHEL A. TRIESCH Inventors

By *Herbert E. Smith*

Attorney

Patented Feb. 25, 1930

1,748,259

UNITED STATES PATENT OFFICE

DALE L. VAN METER AND BARTHEL A. TRIESCH, OF SPOKANE, WASHINGTON; SAID VAN METER ASSIGNOR OF FIVE ONE-HUNDREDTHS TO EARLE J. MOHNEY, OF SPOKANE, WASHINGTON, AND FORTY-FIVE ONE-HUNDREDTHS TO NICHOLAS TRIESCH, OF SPOKANE, WASHINGTON

TOOL RACK

Application filed December 18, 1928. Serial No. 326,893.

Our present invention relates to improvements in tool racks or tool holders designed especially for use at the sides of chopping blocks, as used by butchers and others, to retain the tools or implements in position where they are ready and accessible for use. As is well known to those familiar with the butchering trade, when a cleaver, for instance, after use is placed in the usual rack, small bits of meat are frequently scraped from the implement and lodged in the holder or rack. These small bits of meat, if not promptly removed, decompose quickly and thus render the rack unsanitary and in condition that may spread disease through the medium of the tools that are held in the rack and afterwards used in cutting meat.

The primary object of our invention is the provision of a rack or holder that may with facility be cleansed and thus maintained in a sanitary condition for the reception of the tools or implements; which is comparatively inexpensive in cost of manufacture, is simple in construction, and which may not only be attached to the chopping block with facility, but may also be removed and replaced as the block wears down from use.

The invention consists in certain novel combinations and arrangements of parts as will hereinafter be more fully set forth and claimed.

In the accompanying drawings we have illustrated one complete example of the physical embodiment of our invention wherein the parts are combined and arranged according to the best mode we have so far devised for the practical application of the principles of our invention.

Figure 1:
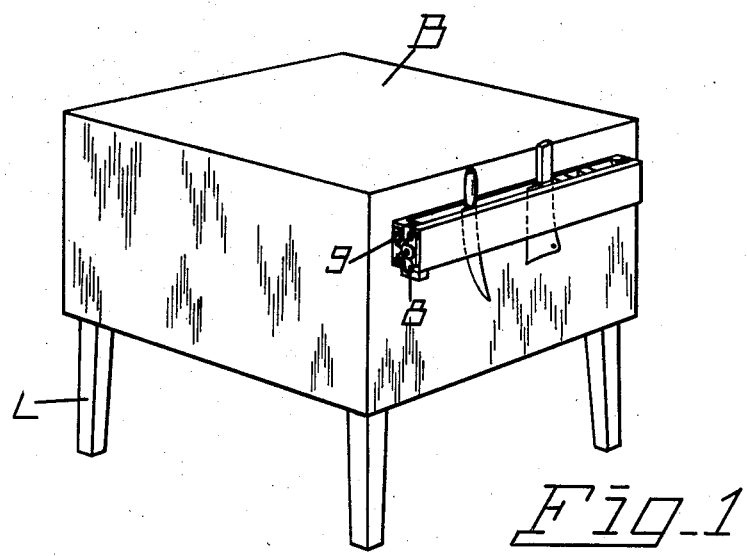
Figure 1 is a perspective view of a chopping block having the tool rack of our invention attached thereto.

In order that the general arrangement and relation of parts may readily be understood we have shown in Figure 1 a typical chopping block B standing on its legs L, the tool rack being attached at one side of the block. As the top surface of the block wears down from continued use, the position of the tool rack is changed by removal and replacement, so that the rack is always in convenient position and readily accessible for the tools held therein as in Figure 1.

The rack is of suitable size, and rectangular, in shape, and is provided with an attaching board 1 and a hinged board 2, the hinge being designated 3 and located preferably at the right end of the rack. Screws 4 are utilized for attaching the rack to the block, said screws passing through the attaching board, and at the ends of the rack the screws pass through spacing blocks 5 and 6, which blocks are thus attached firmly to the attaching board, and provide a slot S in the rack for the reception of the tools or implements. The blocks 5 and 6 are each provided with bottom lugs 7 that project outwardly from the attaching board, thus completing an L-shape for the spacing blocks. The lugs 7 at the ends of the attaching board thus provide positive supports for the opposite ends of the hinged outer board 2 that prevent the hinged board from sagging and maintain the rack in correct position for the reception of the tools.

The free end of the hinged board is secured to the complementary end of the attaching board by a fastener that draws the parts together, as for instance a pivoted cam latch 8 on the hinged board that co-acts with a keeper 9 on the attaching board, and by means of this fastener the spaced, hinged board is firmly held to the attaching or base board of the rack.

In order that the pointed ends of the implements may be turned inwardly toward the chopping block to eliminate danger of injury by personal contact therewith while the implement is in the rack, a longitudinally extending bevel 10 is provided along the upper outer edge of the attaching board. The handle of the implement, at one side, rests upon the beveled edge, and thus tilts the point of the blade inwardly.

If desired, additional spacing blocks 11 and 12 may be attached at the inner side of the hinged board to form separated, small compartments for special tools &c.

Figure 2:
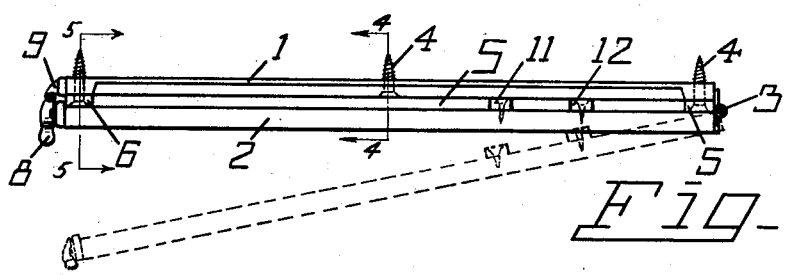
Figure 2 is a top edge view of the rack, enlarged.
Figure 3:
Figure 3 is a front side view of the rack.
Figure 5:
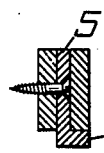
Figure 5 is a transverse sectional view at line 5—5 of Fig. 2.
Figure 4:
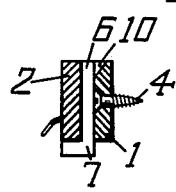
Figure 4 is a transverse sectional view at line 4—4 of Fig. 2.

By dotted lines in Figure 2 the hinged board is shown partly in position, and it will be understood that after the fastener 8—9 has been disengaged, the hinged board may be swung to open position so that access may readily be had to all parts of the rack for scrubbing or otherwise cleansing the rack.

Having thus fully described our invention, what we claim as new and desire to secure by Letters Patent is:—

In a tool rack, the combination of an attaching board, L-shaped spacing blocks secured at the ends of the attaching board and providing outwardly projecting lugs, a second board hinged at one end to the attaching board and resting at both ends on said lugs, to form a slot, and means for fastening the free end of the second board to the attaching board.

In testimony whereof we affix our signatures.

DALE L. VAN METER.
BARTHEL A. TRIESCH.